United States Patent
Kiyoto et al.

(10) Patent No.: US 7,337,465 B2
(45) Date of Patent: Feb. 26, 2008

(54) PEER-TO-PEER COMMUNICATION APPARATUS AND COMMUNICATION METHOD

(75) Inventors: Satoshi Kiyoto, Fujisawa (JP);
Kazuyoshi Hoshino, Komae (JP);
Kazuma Yumoto, Hachioji (JP);
Minoru Hidaka, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 724 days.

(21) Appl. No.: 10/695,944

(22) Filed: Oct. 30, 2003

(65) Prior Publication Data
US 2004/0181689 A1 Sep. 16, 2004

(30) Foreign Application Priority Data
Mar. 11, 2003 (JP) ............... 2003-064328

(51) Int. Cl.
*G06E 17/00* (2006.01)
*H04K 1/00* (2006.01)
*H04L 9/00* (2006.01)

(52) U.S. Cl. ............... 726/1; 726/3; 713/150; 713/160; 713/168

(58) Field of Classification Search ............... 726/3, 726/1; 713/150, 168
See application file for complete search history.

(56) References Cited

U.S. PATENT DOCUMENTS 5,872,847 A    2/1999  Boyle et al.
5,917,615 A *  6/1999  Reifman et al. ............ 358/468
2002/0162026 A1* 10/2002 Neuman et al. ............ 713/201
2002/0178240 A1 11/2002 Fiveash et al.
2005/0055572 A1* 3/2005 Warwick et al. ............ 713/201

FOREIGN PATENT DOCUMENTS

EP    1244322    9/2002

OTHER PUBLICATIONS

"Security Architecture for IP" EITF RFC 2401, Nov. 25, 1998, pp. 14-17.
"Implementation of Transparent and Dynamic VPN Mechanism" Quarterly IPv6 Magazine, Impress Corp., Aug. 18, 2002, Summer 2002, No. 2, pp. 74-75.

* cited by examiner

*Primary Examiner*—Gilberto Barron, Jr.
*Assistant Examiner*—Samson Lemma
(74) *Attorney, Agent, or Firm*—Mattingly, Stanger, Malur & Brundidge, P.C.

(57) ABSTRACT

A peer-to-peer communication apparatus connected to an IP network acquires, from a peer's communication apparatus, presence information including information for judging a communication security environment of the peer's communication apparatus and a security policy to be applied by the peer's communication apparatus to a packet, displays the presence information and security policy information such that a user can judge the prosperity of the security policy information based on the presence information, and processes a data packet to be transmitted to the peer's communication apparatus in accordance with the security policy approved by the user.

7 Claims, 12 Drawing Sheets

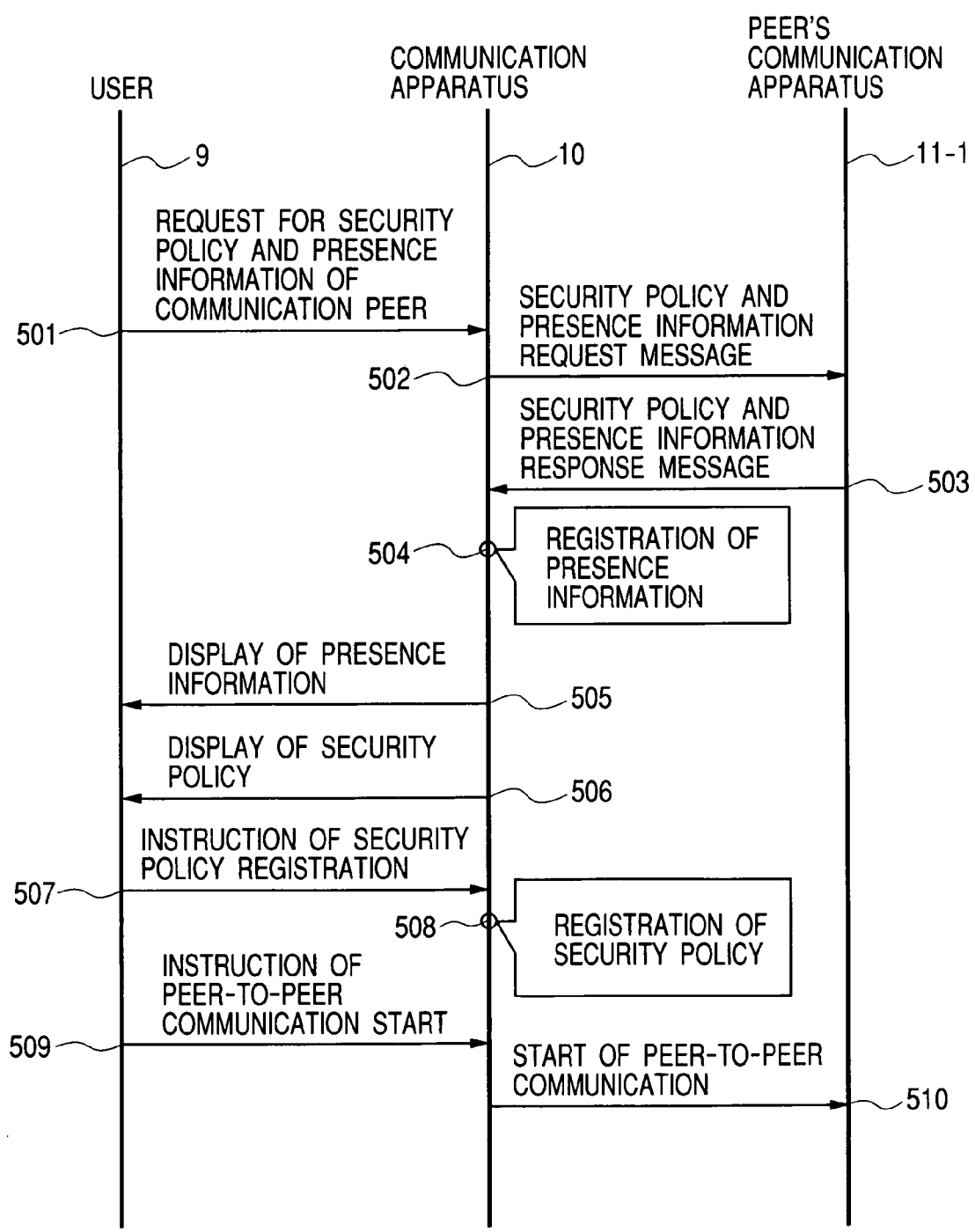

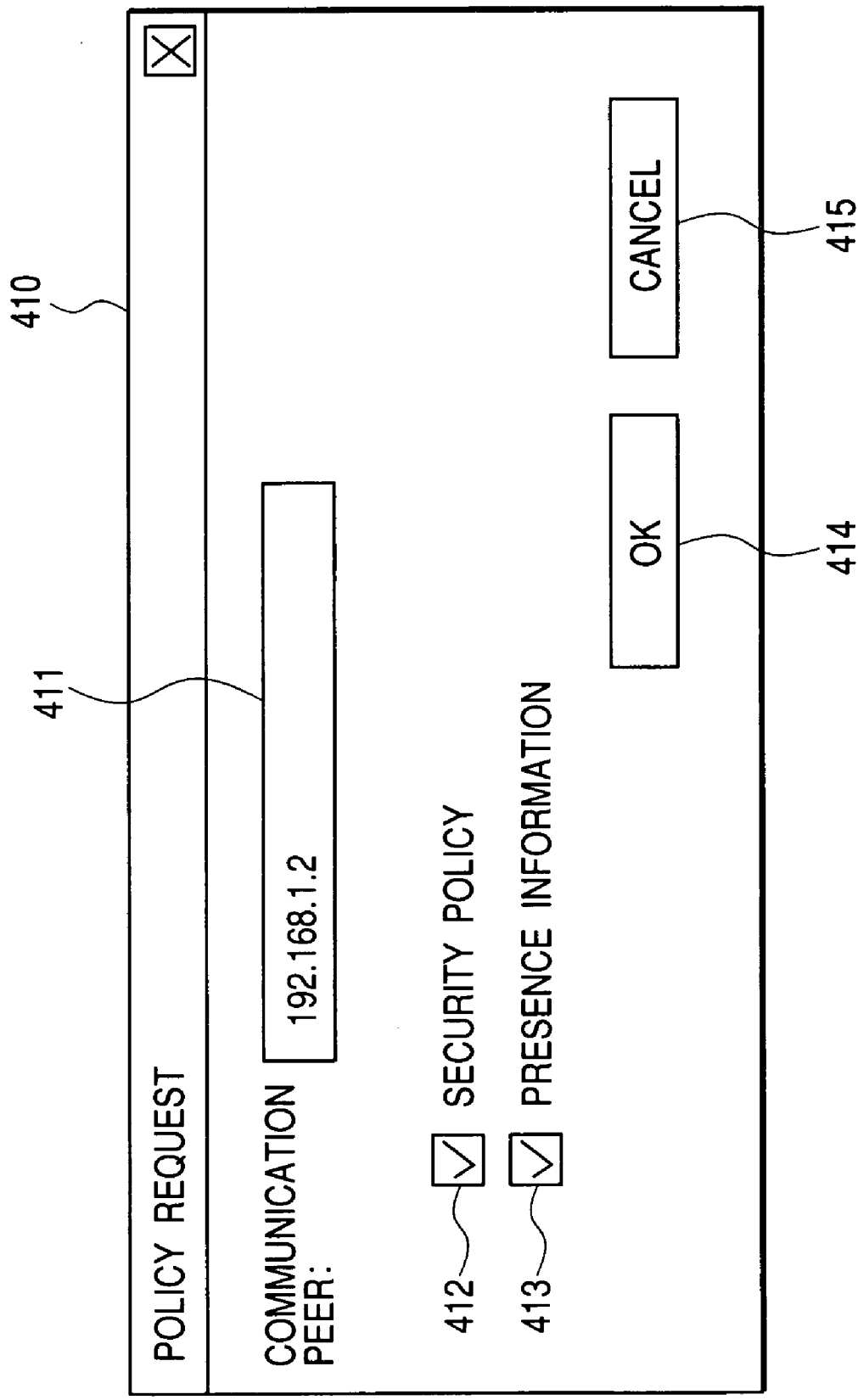

FIG. 5

```
<?xml version="1.0" encoding="UTF-8"?>
<presence xmlns="urn:ietf:params:xml:ns:cpim-pidf"
    xmlns:sp_ex="http://sp.example.com/cpim-security-policy/"
    xmlns:pres_ex="http://pres.example.com/cpim-presence/"
    entity="pres:peerA@example.com">                                    ─530
    <tuple id="peerA_PC">
        <status>
            <basic> open </basic>
            <sp_ex:source_addr>192.168.1.1</sp_ex:source_addr>          ─520
            <sp_ex:source_port>any</sp_ex:source_port>                  ─521
            <sp_ex:destination_addr>192.168.1.2</sp_ex:destination_addr>─522
            <sp_ex:destination_port>any</sp_ex:destination_port>        ─523
            <sp_ex:transport>udp</sp_ex:transport>                      ─524
            <sp_ex:direction>in</sp_ex:direction>                       ─525
            <sp_ex:action>none</sp_ex:action>                           ─526
            <pres_ex:user>John</pres_ex:user>                           ─527
            <pres_ex:location>office</pres_ex:location>                 ─528
        </status>
        <timestamp>2002-09-28T10:49:29Z</timestamp>                     ─529
    </tuple>
</presence>
```

FIG. 6

PRESENCE INFORMATION DATA BASE 400

| ENTITY | IP ADDRESS | USER NAME | LOCATION | TIME |
|---|---|---|---|---|
| peerA@example.com | 196.128.1.2 | John | office | 2002-09-28 10:49:29 |
| ... | ... | ... | ... | ... |
| | | | | |
| | | | | |

FIG. 7

SECURITY POLICY DATA BASE 300

| SOURCE | | DESTINATION | | TRANSPORT LAYER PROTOCOL | DIRECTION | ACTION | PROTOCOL | MODE | END POINT | LEVEL |
|---|---|---|---|---|---|---|---|---|---|---|
| IP ADDRESS | PORT NO. | IP ADDRESS | PORT NO. | | | | | | | |
| 192.168.1.1 | any | 192.168.1.2 | any | udp | out | none | — | — | — | — |
| ... | ... | ... | ... | ... | ... | ... | ... | ... | ... | ... |

FIG. 11

PRESENCE INFORMATION

PRESENCE INFORMATION entity: peerB@example.com

IP ADDRESS: 133.134.10.10

USER NAME: Bob

930 —— LOCATION: external

TIME: 2002-09-28 16:15:46

1100

OK

CANCEL

POLICY INFORMATION  ☒

SECURITY POLICY

SOURCE ADDRESS: [192.168.1.1]  PORT: ○ [ ]  ◉ any

DESTINATION ADDRESS: [133.134.10.10]  PORT: ○ [ ]  ◉ any

TRANSPORT LAYER: ○ tcp  ◉ udp  ○ any

DIRECTION: ○ in  ◉ out

ACTION: ○ discard

850 — ◉ none

○ ipsec

PROTOCOL: ☐ ah  ☐ esp  ☐ ipcomp

MODE: ○ transport  ○ tunnel

END POINT: [ ]

LEVEL: ○ default  ○ use  ○ require

[ REGISTER ]  [ CANCEL ]

PEER-TO-PEER COMMUNICATION APPARATUS AND COMMUNICATION METHOD

BACKGROUND OF THE INVENTION (1) Field of the Invention

The present invention relates to a one-to-one peer-to-peer communication apparatus and, more particularly, to a peer-to-peer communication apparatus and method to which optimum communication security rules in accordance with a communication peer and a security environment in the network of an apparatus used by the communication peer are applicable.

(2) Description of the Related Art

In a peer-to-peer communication system represented by the Internet telephone such as VoIP (Voice over IP), the encryption and authentication of packets is performed to prevent the listen-in or falsification of the contents of communication by an outsider. The encryption and authentication of the packet is performed in accordance with a "security policy" which is a sequence of rules showing how each of packets is to be encrypted and authenticated. A data base for storing such a security policy is termed a security policy data base which is normally stored in a device termed a policy server.

The IETF (Internet Engineering Task Force) as an organization for standardizing Internet technologies has defined IPsec (IP security) as protocols for ensuring security (prevention of the listen-in or falsification of the contents of communication by an outsider) on the IP (Internet Protocol) packet level in the Internet (Non-Patent Document 1: IETF RFC 2401, Nov. 25, 1998, pp. 14-17).

According to the foregoing protocols, a security policy to be applied to peer-to-peer communication of concern is selected by using information on the respective IP addresses and port numbers of a source and a destination, the types of higher-layer protocols such as TCP (Transmission Control Protocol) and UDP (User Datagram Protocol), and the direction of communication indicative of whether a target packet to which the security policy is to be applied is a received packet or a packet to be transmitted. By using security requirements described in the selected security policy, it is judged whether or not, e.g., a received packet should be discarded, the encryption (decryption) or authentication of packets to be transmitted (received packet) should be performed, the encryption or authentication is mandatory or performed only when it is possible, or the like. Specifically, a transmitter apparatus having an IPsec function retrieves, in the security policy database, the security policy corresponding to the source address and the destination address to be attached to a packet to be transmitted, performs encryption and authentication processes satisfying the security requirements described in the security policy with respect to the packet to be transmitted, and then transmits the packet to a communication peer.

Likewise, a receiver apparatus having the IPsec function retrieves, in the security policy data base, the security policy corresponding to the source address and the destination address attached to the received packet and examines whether or not the encryption and authentication processes satisfying the security requirements described in the security policy have been performed with respect to the received packet. The received packet not satisfying the security requirements is discarded without being passed to a higher layer.

A technology for ensuring communication security by using IPsec in a VPN (Virtual Private Network) which establishes a virtual dedicated line between two communication nodes on the Internet is disclosed in, e.g., Takayuki Ishii et al., "Implementation of Transparent and Dynamic VPN Mechanism" (Non-Patent Document 2: Quarterly IPv6 Magazine, Impress Corporation, Aug. 18, 2002, Summer 2002 No. 2, pp. 74-75). The conventional technology disclosed in Non-Patent Document 2 acquires security policy information to be used in peer-to-peer communication from an IPsec communication management server provided on a network by each of communication apparatus and solves a problem associated with detailed information such as an encryption key used for encryption through negotiation between the individual communication apparatus.

However, the peer-to-peer communication using IPsec disclosed in Non-Patent. Document 1 has the problem that, if the security requirements described in the security policy applied to the packet to be transmitted at the transmitter apparatus do not satisfy the security requirements registered at the receiver apparatus, the packet transmitted from the transmitter apparatus is discarded after being received by the receiver apparatus.

On the other hand, the IPsec communication management server disclosed in Non-Patent Document 2 is a server belonging to an external organization which centrally manages the communication security policies on the network from the viewpoint of the user of each of the communication apparatus. Accordingly, the IPsec communication management server cannot change the security policy in response to the need of each of the communication apparatus and cannot provide a flexible security function which allows the user to freely select a security policy depending on a communication situation.

SUMMARY OF THE INVENTION

In order to implement communication without discarding packets between two communication apparatus each having the IPsec function, it is necessary for the two communication apparatus to exchange their respective security policy information therebetween prior to the transmission of data packets such that the packets are transmitted based on the security policy satisfying the security requirements placed by the peer's communication apparatus. If a security environment changes with the movement of the peer's communication apparatus as in the case of peer-to-peer communication between mobile terminals, it is desirable to change the security policy to be applied depending on the situation of a communication peer. If it is possible to change the security level depending on factors such as whether the communication peer is a family member, a friend, or an acquaintance and whether the communication is for a business or private purpose or merely for an advertising purpose, further optimization of the communication can be expected.

For example, peer-to-peer communication between two communication apparatus connected to a private network is performed conceivably in an environment for which a proper level of security has been guaranteed so that each of the apparatus is permitted to perform light communication which uses a security policy on a low security level and does not require the encryption process of a packet or the like. If the peer's communication terminal is on the move and connected to a public network, on the other hand, it is desirable to apply a security policy on a high security level and ensure security through the encryption of packets.

However, it is not necessarily the case where each of the communication apparatus has selected a proper security policy in accordance with a communication environment, as described above. For example, when a mobile terminal connected to a private network has moved and the network to which the terminal is connected has changed from the private network to a public network and if the mobile terminal communicates with a terminal connected to the private network under less stringent security requirements which are proper for the private network by using the previous security policy, the risk of the listen-in or falsification of the packets by an outsider is increased disadvantageously.

It is therefore an object of the present invention to provide a peer-to-peer communication apparatus capable of ensuring the safety of communication by applying a proper security policy in accordance with a communication environment.

Another object of the present invention is to provide a peer-to-peer communication apparatus capable of relatively freely selecting the security policy in accordance with the current location of a communication peer.

In order to achieve the object, a peer-to-peer communication apparatus according to the present invention is characterized in that it acquires, prior to packet communication, a security policy used by a peer's communication apparatus and presence information including information for judging a communication security environment of the peer's communication apparatus therefrom and allows a user to judge the propriety of a security policy and to determine a security policy to be applied to the packet communication with the peer's communication apparatus by displaying the presence information and the security policy.

More specifically, the peer-to-peer communication apparatus according to the present invention comprises first means for performing an encryption process and/or an authentication process with respect to a packet, second means for acquiring, from a peer's communication apparatus specified by a user of the communication apparatus, presence information including information for judging a communication security environment of the peer's communication apparatus and security policy information including an encryption rule and an authentication rule each to be applied to packets by the peer's communication apparatus, and third means for displaying the presence information and the security policy information such that the user judges propriety of the security policy information based on the presence information and allowing the user to partly change the security policy information, the first means processing a packet to be transmitted to the peer's communication apparatus in accordance with a security policy approved by the user.

The peer-to-peer communication apparatus according to the present invention further comprises: a memory for storing the security policy information acquired from the peer's communication apparatus or the security policy information partly changed by the user via the third means, wherein the first means processes the packet to be transmitted to the peer's communication apparatus in accordance with a security policy stored in the memory.

The peer-to-peer communication apparatus according to the present invention further comprises a first memory for storing default security policy information to be applied by the communication apparatus to peer-to-peer communication with the other communication apparatus, a second memory for storing the presence information including the information for judging the communication security environment of the communication apparatus, and fourth means for returning, in response to a request for the presence information and the security policy information from the other communication apparatus, a response message including the default security policy information read out from the first memory and the presence information read out from the second memory.

The peer-to-peer communication apparatus according to the present invention further comprises a presence information processing unit for partly changing, upon occurrence of a change in the communication environment resulting from movement of the communication apparatus, the presence information stored in the second memory.

A method for peer-to-peer communication according to the present invention comprises the steps of: requesting from a first communication apparatus to a second communication apparatus, presence information for judging a communication security environment of the second communication apparatus and security policy information including an encryption rule and an authentication rule to be applied to a packet by the second communication apparatus; transmitting, from the second communication apparatus to the first communication apparatus, the presence information and security policy information of the second communication apparatus; outputting by the first communication apparatus to a display screen, the presence information and security policy information received from the second communication apparatus such that a user can judge propriety of the security policy information based on the presence information; and performing packet communication with the second communication apparatus by the first communication apparatus in accordance with a security policy approved by the user on the display screen.

If the user judges, from the information on the result of judging the communication security environment included in the presence information, that the security policy is improper, the user partly corrects the security policy information outputted to the display screen and the first communication apparatus performs data packet communication with the second communication apparatus in accordance with the corrected security policy.

BRIEF DESCRIPTION OF THE DRAWINGS

FIG. 3 is a sequence diagram illustrating a first embodiment of a communication procedure according to the present invention which is performed prior to peer-to-peer communication between the communication apparatus 10 and 11-1 shown in FIG. 2;

FIG. 4 is a view showing an example of a GUI screen on the communication apparatus in the first embodiment of the present invention;

FIG. 5 is a view showing an example of presence information and a security policy described in a response message from a peer's communication apparatus in the first embodiment;

FIG. 6 is a view showing an example of a presence information data base;

FIG. 7 is a view showing an example of a security policy data base;

FIG. 11 is a view showing an example of the presence information display screen in the second embodiment of the present invention;

FIG. 12 is a view showing an example of the security policy display screen in the second embodiment.

DESCRIPTION OF THE PREFERRED EMBODIMENTS

Figure 1:
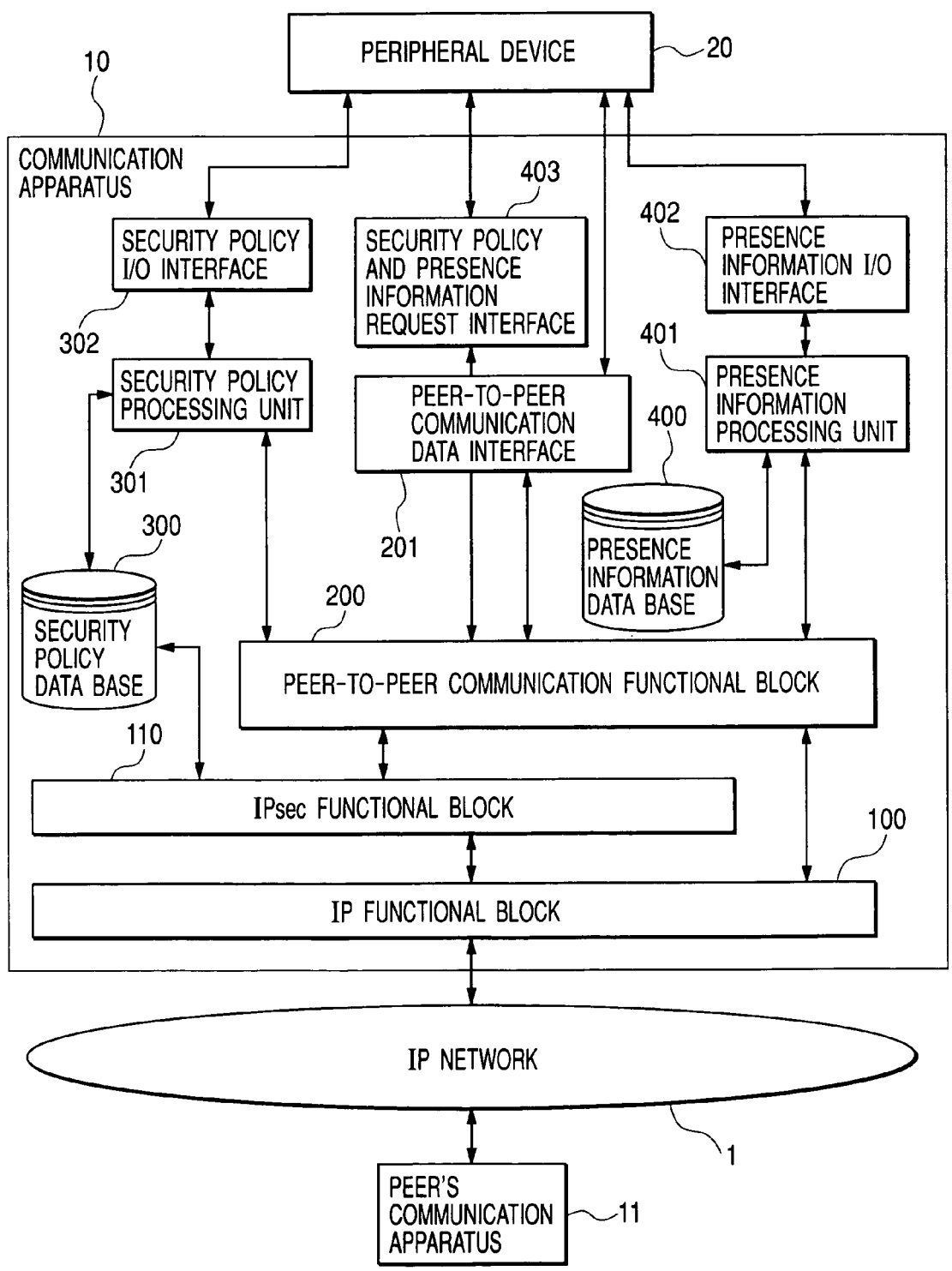
FIG. 1 is a block diagram showing a structure of a communication apparatus according to the present invention.

Referring to the drawings, the individual embodiments of the present invention will be described herein below. By way of example, a description will be given to the case where an IP network is used as a communication network and IPsec is used as protocols for ensuring communication safety.

FIG. 1 shows the structure of a communication apparatus 10 according to the present invention. The communication apparatus 10 performs communication with a peer's communication apparatus 11 via an IP network 1. The structure of the communication apparatus 10 is shown focusing on the functional blocks related to the determination of a security policy, which will be described in detail below. In an actual situation, the communication apparatus 10 also has other functional blocks, such as a mobile PC or an IP telephone not shown, which differ depending on the type of the communication apparatus. The peer's communication apparatus 11 is also assumed to have the same functional structure as the communication apparatus 10.

The communication apparatus 10 according to the present invention is comprised of an IP functional block 100, an IPsec functional block 110, a peer-to-peer communication functional block 200, a peer-to-peer communication data interface 201, a security policy data base 300, a security policy processing unit 301, a security policy I/O interface 302, a presence information data base 400, a presence information processing unit 401, a presence information I/O interface 402, and a security policy presence information request interface 403.

The IP functional block 100 is an interface for transmitting and receiving data packets to and from the IP network 1 and performs the termination of received IP packets and the generation of an IP packet to be transmitted. The IPsec functional block 110 is for ensuring security in an IP layer and performs authentication and encryption of IP packets. The peer-to-peer communication functional block 200 is for implementing peer-to-peer communication and performs the establishment of a peer-to-peer communication session between the individual communication apparatus, peer-to-peer communication on the established session, and the releasing of the session. The peer-to-peer communication data interface 201 performs the reception and transmission of peer-to-peer communication data between a peripheral device 20 and the peer-to-peer communication functional block 200.

The security policy data base 300 is a data base for storing security policy information and for managing a security policy to be used in the IPsec functional block 110. In the security policy data base 300, a plurality of entries indicative of security policies for each communication peer and an entry indicative of a default security policy to be applied by the communication apparatus 10 to unspecified communication peers are registered.

The security policy processing unit 301 is a functional block for accessing the security policy data base to perform the registration, deletion, and reference of a security policy. The security policy I/O interface 302 is a user interface for accessing the security policy data base, which enables a user an access to the security policy data base via the peripheral device 20.

The security policy presence information request interface 403 is a user interface for receiving a request to acquire a security policy and presence information, which enables a request to acquire the security policy and presence information of the peer's communication apparatus from the user via the peripheral device 20. The presence information data base 400 is for storing the presence information including information for judging a communication security environment, which manages the respective presence information of the communication apparatus 10 and the peer's communication apparatus.

The presence information processing unit 401 is a functional block for accessing the presence information data base 400 to perform the registration, deletion, correction, and reference of presence information. If the communication apparatus 10 has a mobile terminal function and acquires a care of address upon connection to the IP network on the move, e.g., the presence information processing unit 401 judges based on the address system of the care of address, whether the communication apparatus is connected to a private network (whether the location of the communication apparatus is inside an office) or not and updates the location of the communication apparatus to be used as information for judging the communication security environment of the communication apparatus 10 which is stored in the data base 400. The presence information I/O interface 402 is a user interface for accessing the presence information data base 400, which enables the user an access to the presence information data base 400 via the peripheral device 20.

The security policy I/O interface 302, the security policy presence information request interface 403, and the presence information I/O interface 402 are connected to the peripheral device 20 including a display unit, a keyboard, and a mouse prepared outside the communication apparatus 10 and enable, e.g., the display of output information on the display unit and the inputting of various information from the user using the keyboard or mouse.

Figure 2:
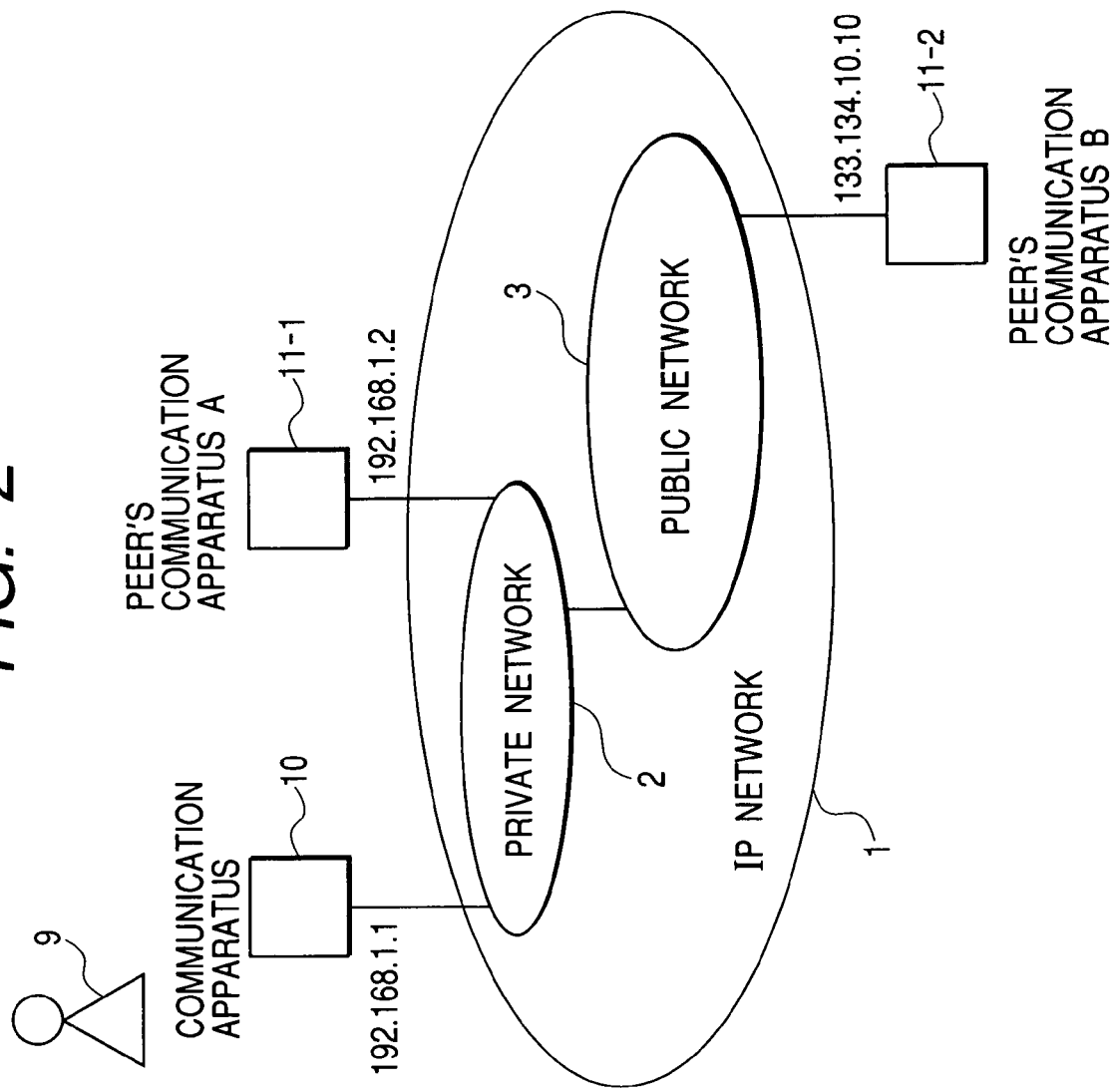
FIG. 2 is a view for illustrating a network architecture to which the communication apparatus according to the present invention is applied.

FIG. 2 shows an example of a network architecture to which the communication apparatus 10 according to the present invention is applied. A description will be given herein to the case where the user 9 of the communication apparatus 10 performs peer-to-peer communication with a peer's communication apparatus 11-1 via a private network 2 (first embodiment) and to the case where the user 9 of the communication apparatus 10 performs peer-to-peer communication with a peer's communication apparatus 11-2 via the private network 2 and a public network 3 (second embodiment).

It is assumed that the communication apparatus 10 and the peer's communication apparatus 11-1 have, as their respective IP addresses, private addresses "192.168.1.1" and "192.168.1.2" on the class C defined by RFC1597 determined by the IETF which is an organization for Internet standardization, while the peer's communication apparatus 11-2 has an IP address "133.134.10.10". These IP address values are examples provided for easy understanding of the embodiments so that no problem is encountered if other addresses are used.

As the first embodiment, a method for communication between the communication apparatus 10 and the peer's communication apparatus 11-1 each connected to the private network 2 will be described first with reference to FIGS. 3 to 9. Then, as the second embodiment, a method for communication between the communication apparatus 10 connected to the private network 2 and the peer's communication apparatus 11-2 connected to the public network 3 will be described with reference to FIGS. 10 to 13.

FIG. 3 shows an operational procedure executed by the user 9 for the determination of a security policy prior to the start of the peer-to-peer communication and a sequence of communication messages exchanged between the communication apparatus 10 and the peer's communication apparatus 11-1 in the first embodiment of the present invention.

The user 9 inputs from the peripheral device 20 shown in FIG. 1 to the communication apparatus 10, a request to obtain the security policy and presence information of the peer's communication apparatus 11-1 via the security policy presence information request interface 403 (step 501). Upon receiving the request, the communication apparatus 10 generates a message requesting the peer's communication apparatus 11-1 to transmit the presence information and the security policy by the peer-to-peer communication functional block 200, converts the request message to an IP packet by the IP functional block 100, and transmits the IP packet to the private network 2 (step 502).

The IP packet is a special packet for exchanging security policy information between individual communication apparatus. Unlike a normal data packet, the IP packet is generated in accordance with a format defined by, e.g., Internet-Draft (draft-IETF-impp-cpim-pidf-7. txt). Accordingly, the IP packet is received by the communication apparatus 11-1 without being discarded irrespective of whether or not it satisfies the security policy of the communication apparatus 11-1 as a receiver at this time.

Upon receiving the IP packet including the request message, the peer's communication apparatus 11-1 returns a response message indicative of the presence information and security policy of the communication apparatus 11-1 in the form of an IP packet to the communication peer 10 (step 503). Upon receiving the response packet including the response message from the peer's communication apparatus 11-1, the communication apparatus 10 passes the response packet to the presence information processing unit 401 and the security policy processing unit 301 via the peer-to-peer communication functional block 200.

The presence information processing unit 401 analyzes the contents of the response packet, registers the presence information of the peer's communication apparatus 11-1 extracted from the response message into the presence information data base 400. (step 504) and displays the presence information of the peer's communication apparatus 11-1 on the peripheral device 200 via the presence information I/O interface 402 (step 505). Likewise, the security policy processing unit 301 analyzes the response packet from the peer's communication apparatus 11-1, extracts the security policy data of the peer's communication apparatus 11-1 from the response message, displays the security policy on the peripheral device 20 via the security policy I/O interface 302 (step 506), and waits for a response from the user.

The user 9 examines the contents of the security policy of the peer's communication apparatus 11-1 to the communication apparatus 10, which is displayed on the peripheral device 20, partly corrects the security policy by, e.g., raising or lowering the security level if necessary, and then instructs the registration of the security policy (step 507). The registration instruction is inputted to the security policy processing unit 301 via the I/O interface 302. Upon receiving the registration instruction, the security policy processing unit 301 registers the security policy of the peer's communication apparatus extracted from the response message or the security policy corrected by the user into the security policy data base 300 (step 508).

After instructing the registration of the security policy (step 507), the user 9 instructs (step 509) the start of peer-to-peer communication with the peer's communication apparatus 11-1 from the peripheral device 20. Upon receiving the instruction to start the peer-to-peer communication, the communication apparatus 10 activates the peer-to-peer communication functional block 200 and starts the peer-to-peer communication with the peer's communication apparatus 11-1 (step 510).

In the peer-to-peer communication, transmission data supplied from the peripheral device 20 or from an external device, terminal, or the like not shown is inputted to the peer-to-peer communication functional block 200 via the peer-to-peer communication data interface 201. Upon receiving normal transmission data to be transmitted to the peer's communication apparatus from the interface 201, the peer-to-peer communication functional block 200 passes the transmission data and attribute information in association with the transmission data to the IPsec functional block 110, The attribute information includes an IP address, a port number, and the type of a higher layer protocol. The IPsec functional block 110 refers to, based on the attributes information, the security policy of the peer's communication apparatus that has been registered in the security policy data base 300, performs an encryption process, an authentication process, and the like on the transmission data in accordance with the security policy, and transmits the resultant data to the IP functional block 100.

FIG. 4 shows an example of a GUI (graphical user interface) screen 410 provided by the security policy and presence information request interface 403 to the display unit as a part of the peripheral device 20 in the step 501 of requesting the security policy and presence information of the peer's communication apparatus of FIG. 3. The user of the communication apparatus 10 inputs the IP address of the peer's communication apparatus, e.g., "192.168.1.2" to a text box 411, selects or checks at least one of check boxes 412 and 413 indicative of information types that corresponds to the information the user needs, and then pushes an OK button 414, thereby to input the request for the security policy and the presence information to the communication apparatus 10. Although the present embodiment has specified the communication peer by inputting the IP address to the text box 411, it is also possible to input another identification information assigned to the communication peer such as, e.g., an e-mail address or a mobile phone number instead of the IP address.

FIG. 5 shows an example of a portion describing the presence information and the security policy in the response message transmitted from the peer's communication apparatus 11-1 in the response step 503 of FIG. 3. In this example, each of the presence information and the security policy is described in accordance with a format based on PIDF (Presence Information Data Format) under preparation at a WG (Working Group) for the IMPP (Instant Messaging and Presence Protocol) of the IETF (Internet Engineering Task Force).

In FIG. 5, the lines 520 to 526 indicate information on the security policy and the lines 527 and 528 indicate the presence information. In this example, the security policy information specifies the IP address 520 and the port number 521 of the request source communication apparatus 10, the IP address 522 and port number 523 of the peer's communication apparatus 11-1, the protocol type 524 of a transport layer, a direction 525 indicative of whether a target packet to which the security policy is to be applied is a packet to be transmitted ("out") or to be received ("in"), and an action 526 to the packet. On the other hand, the presence information indicates the user name 528 of the peer's communication apparatus and the location 528 thereof. The line 529 indicates a time stamp, and the line 530 indicates the identification information (entity) of the peer's communication apparatus 11-1. The message of concern is transmitted in accordance with peer-to-peer communication protocols represented by, e.g., SIP defined in the RFC (Request for Comments) of the IETF.

FIG. 6 shows an example of a presence information entry registered in the presence information data base 400 in the step 504 of FIG. 3. Each presence information entry 600 registered in correspondence with a peer's communication apparatus is composed of the identification information (entity) 620 of the communication apparatus, the IP address 621 of the communication apparatus, the current user name 622 of the communication apparatus, the location 623 of the communication apparatus, and the production time 624 of the presence information. In an entry 600-1 corresponding to the communication apparatus 11-1, the respective contents of the items 620 and 622 to 624 correspond to the respective contents of the lines 530 and 527 to 529 extracted from the response message in FIG. 5. The IP address 621 corresponds to the source IP address contained in the IP header of the response message.

FIG. 7 shows an example of a security policy entry registered in the security policy data base 300 in the step 508 of FIG. 3. Each security policy entry registered in correspondence with a peer's communication apparatus includes the IP address 710 and port number 711 of a source apparatus, the IP address 712 and port number 713 of a destination apparatus, a transport layer protocol 714, a direction 715 indicative of transmission or reception, and an action 716 indicative of a process to be performed with respect to a packet.

If "ipsec" is specified in the action 716, a protocol 717, a mode 718, an end point 719, and a level 720 are further added to the security policy entry. In a security policy entry 300-1 for the communication apparatus 11-1, the items 710 to 716 correspond to the respective contents of the lines 520 to 526 in the response message shown in FIG. 5.

Figure 8:
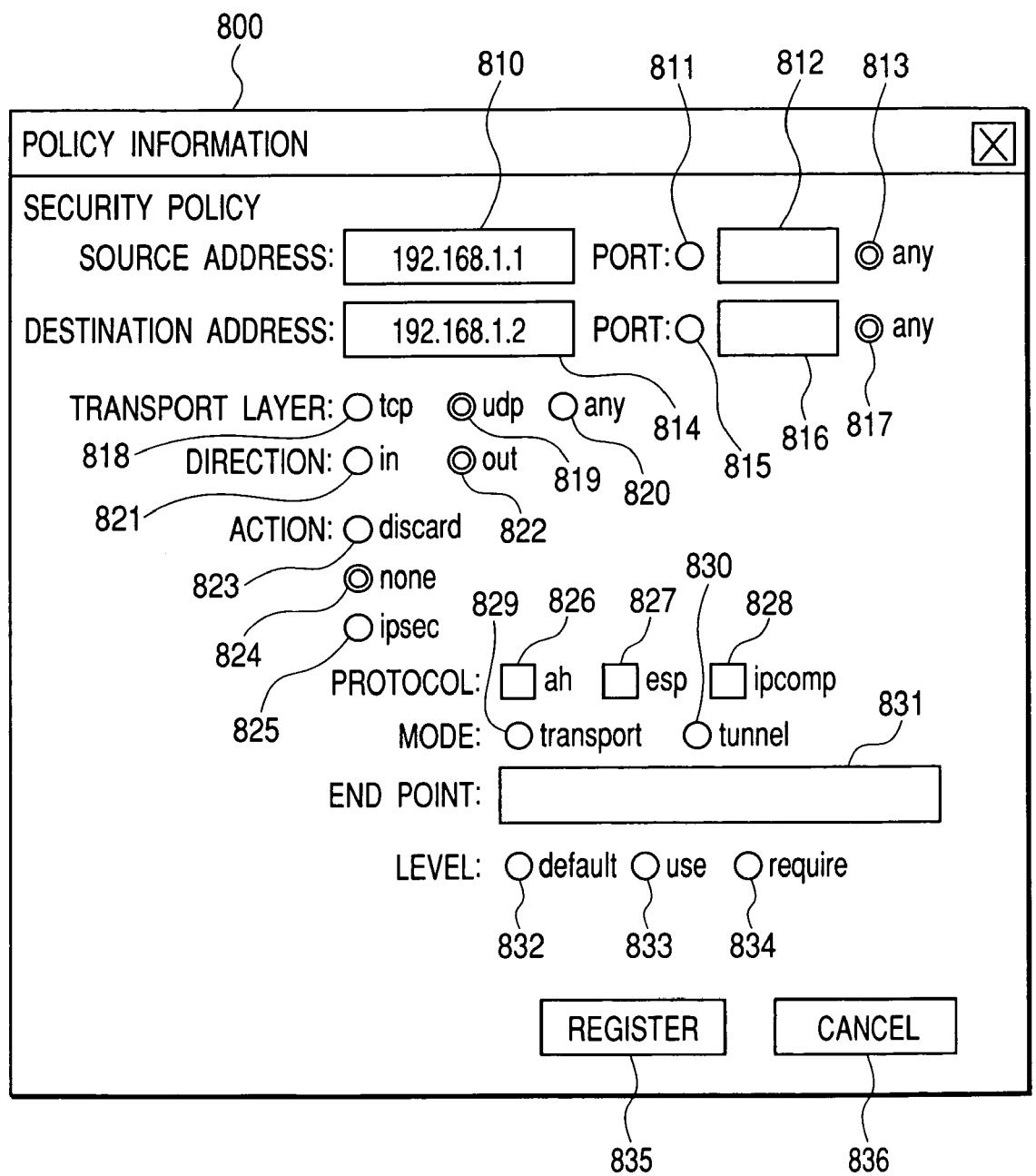
FIG. 8 is a view showing an example of a security policy display screen in the first embodiment.

FIG. 8 shows an example, of a display screen 800 for the security policy provided by the security policy I/O interface 302 to a display unit or the like in the step 506. The respective IP addresses of the source (communication apparatus 10) and the destination (communication apparatus 11-1) are displayed in text boxes 810 and 814, respectively. If a specific port has been specified by the security policy, the check box 811 and/or 815 has been selected and specific port numbers are displayed in text boxes 812 and 816. If a specific port has not been specified, the check box 813 and/or 817 displaying "any" has been selected.

For the transport layer protocol, a radio button 818 or 819 corresponding to a protocol name specified by the security policy has been selected. If a protocol has not been specified, a radio button 820 indicative of "any" is selected. For the direction of packet transmission, a radio button 821 indicative of "in" has been selected in the case of a received packet, while a radio button 822 indicative of "out" has been selected in the case of a transmission packet.

If a packet discarding process is performed as a process "Action" to a packet, a radio button 823 indicative of "discard" has been selected. If a special process is not performed, a radio button 824 indicative of "none" has been selected. If an "ipsec" process is performed, a radio button 825 indicative of "ipsec" has been selected. When the radio button for "ipsec" has been selected, at least one of "ah" (authentication) 826, "esp" (encryption) 827, and "ipcomp" (compression) 828 each for specifying the type of a security protocol to be applied is further selected. The radio buttons 829 and 830 indicate whether a mode to be applied is a transport mode or a tunnel mode. When the tunnel mode has been specified, a text box 831 indicative of a communication apparatus forming the other end of a tunnel is displayed. As a security level, any of "default" 832, "use" 833 which recommends the execution of a security process if it is possible, and "require" 834 which mandates the execution of the security process is displayed.

In FIG. 8, the double circle represents the radio button selected in accordance with the security policy information. From the drawing, it will be understood that, as the security policy to the peer's communication apparatus 11-1, the source IP address "192.168.1.1", the source port "any", the destination IP address "192.168.1.2", the destination port "any", the transport "udp", the direction "out", and the action "none" have been specified based on the security policy information shown in FIG. 3 in the example shown herein.

Figure 9:
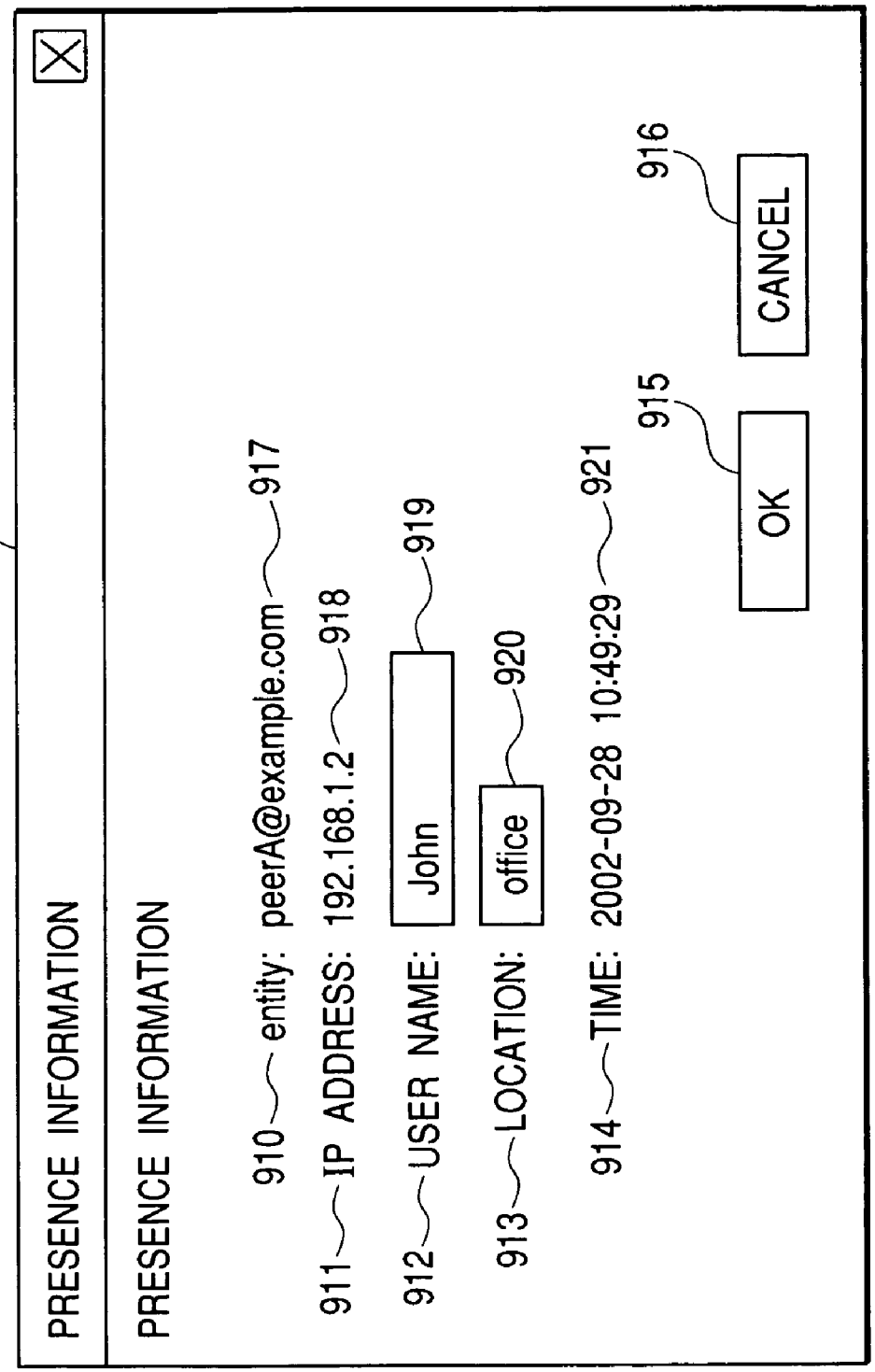
FIG. 9 is a view showing an example of a presence information display screen in the first embodiment.

FIG. 9 shows an example of the presence information display screen 900 of the peer's communication apparatus provided by the presence information I/O interface 402 to the display unit in the step 505 of FIG. 3. The presence information display screen 900 and the security policy display screen 800 are formed in a multi-window mode on the same display screen to be simultaneously referred to by the user. Alternatively, the display screens 800 and 900 may be shown switchably on the display.

The presence information display screen 900 displays "entity" 910 indicative of the identification information of the peer's communication apparatus, the IP address 911 of the peer's communication apparatus, the current user 912 of the peer's communication apparatus, the location 913 of the peer's communication apparatus, and the production time 914 of presence information. In the example shown in FIG. 9, "peerA@example.com (917)", "192.168.1.2" (918), "John" (919), "office" (920), "2002-09-28 10:49:29" (921) are displayed as the presence information of the peer's communication apparatus 11-1.

The presence information obtained through the specification of the peer's communication apparatus by the user is automatically registered in the presence information data base 400. If the user changes the expressions of the user 919 and location 920 of the peer's communication partner being displayed on the presence information display screen 900 into more familiar ones according to the user's preference, however, it is also possible for the presence information processing unit 401 to reflect the result of correction in the presence information already registered in the data base.

Thus, the user of the communication apparatus 10 can recognize from the presence information display screen 900, that the peer's communication apparatus 11-1 is in the office and connected to the private IP network. In this case, the user judges that the changing of the security policy in the security policy display screen 800 shown in FIG. 8 is unnecessary and pushes a registration button 835. As a result, the security policy information with the content displayed on the presence information display screen is registered in the security policy data base 300 and used in the IPsec functional block.

As a second example of the present invention, a method for communication between the communication apparatus 10 and the communication apparatus 11-2 via the private IP network 2 and the public network 3 will be described next.

Figure 10:
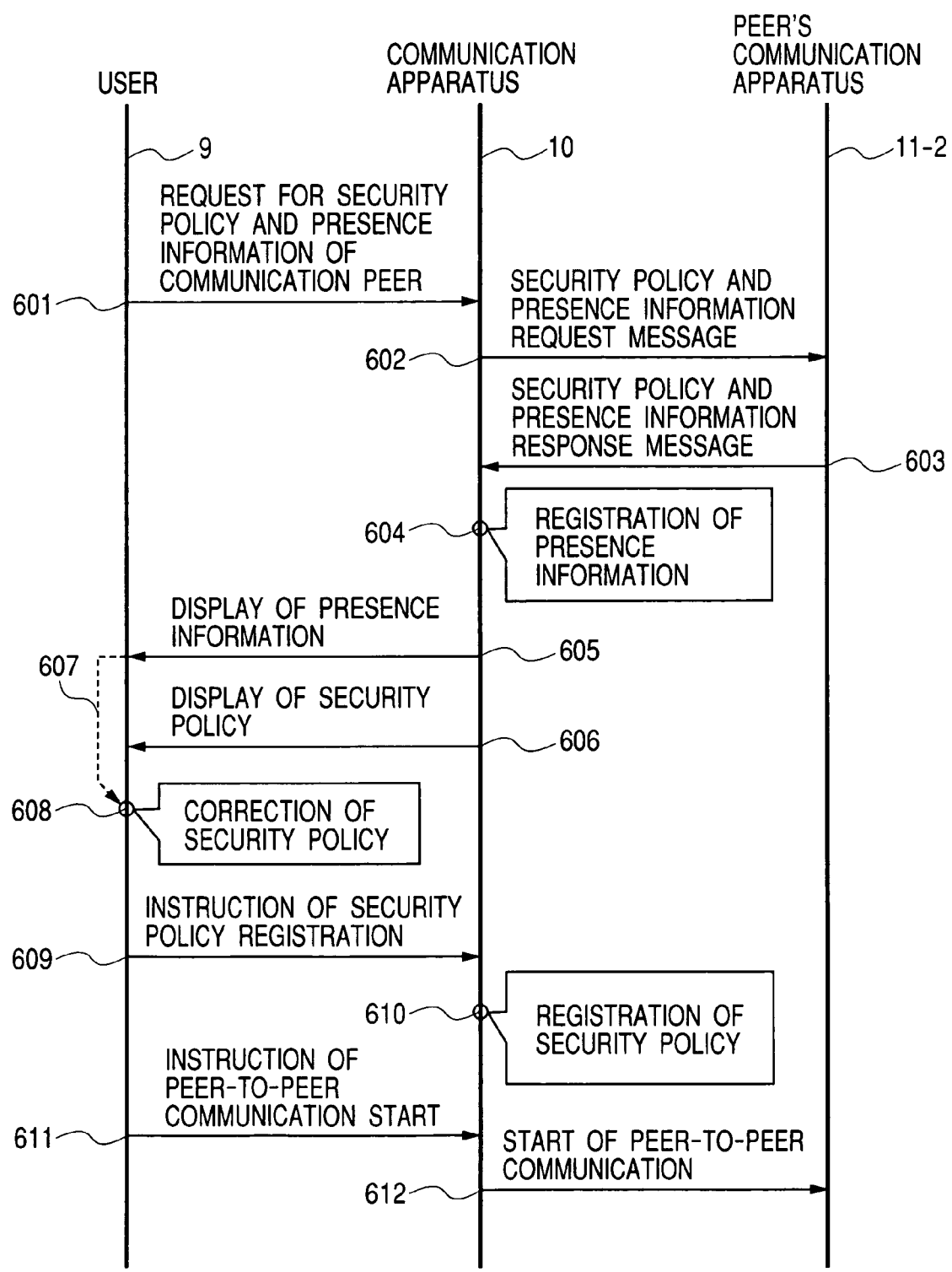
FIG. 10 is a sequence diagram illustrating a second embodiment of the communication procedure according to the present invention which is performed prior to peer-to-peer communication between the communication apparatus 10 and 11-2 shown in FIG. 2.

FIG. 10 shows the operational procedure of the user 9 to be executed prior to the start of the peer-to-peer communication and a sequence of communication messages exchanged between the communication apparatus 10 and the peer's communication apparatus 11-2 in the second embodiment of the present invention.

The user 9 transmits, to the communication apparatus 10, a request to acquire the security policy and presence information of the peer's communication apparatus 11-2 via a GUI screen provided to the display unit by the security policy presence information request interface 403 (step 601), in the same manner as in the first embodiment which performs communication with the communication apparatus 11-1 described above. Upon receiving the request, the communication apparatus 10 transmits a message requesting the presence information and the security policy to the peer's communication apparatus 11-2 (step 602) and the peer's communication apparatus 11-2 returns a response message with the presence information and the security policy (step 603).

In the communication apparatus 10 that has received the response message, the presence information processing unit 401 registers the presence information of the peer's communication apparatus 11-2 into the presence information database 400 (step 604) and displays the presence information of the peer's communication apparatus 11-2 on the display unit of the peripheral device 20 via the presence information I/O interface 402 (step 605). At this time, the security policy processing unit 301 displays the security policy of the peer's communication apparatus 11-2 on the display unit via the security policy I/O interface 302 (step 606). The foregoing sequence is identical to the sequence of communication messages exchanged between the communication apparatus 10 and the peer's communication apparatus 11-1 via the private IP network 2 according to the first embodiment described with reference to FIG. 3.

FIG. 11 shows an example of the display screen 110 of the presence information displayed on the display unit in the step 605. In this example, the location 930 is "external", which indicates that the peer's communication apparatus 11-2 is connected to a public network. The user 9 then analyzes the security policy display screen of the peer's communication apparatus 11-2 displayed by the security policy processing unit 301 and judges whether the security level is proper for the present situation or not.

FIG. 12 shows an example of a security policy display screen 1200 displayed in the step 605. The security policy displayed here is the same as that shown in FIG. 8 except for the value of the IP address of the destination and indicates that the action to a packet is "none" (850), i.e., a security process is not performed with respect to the packet.

In this case, the user 9 judges that the security policy is insufficient in terms of ensuring communication safety, changes the security policy for the peer's communication apparatus 11-2 to a higher level (step 608), and then instructs the communication apparatus 10 to register the changed security policy (step 609). Upon receiving the registration instruction, the communication apparatus 10 registers the changed security policy into the security policy data base 300 (step 610).

Figure 13:
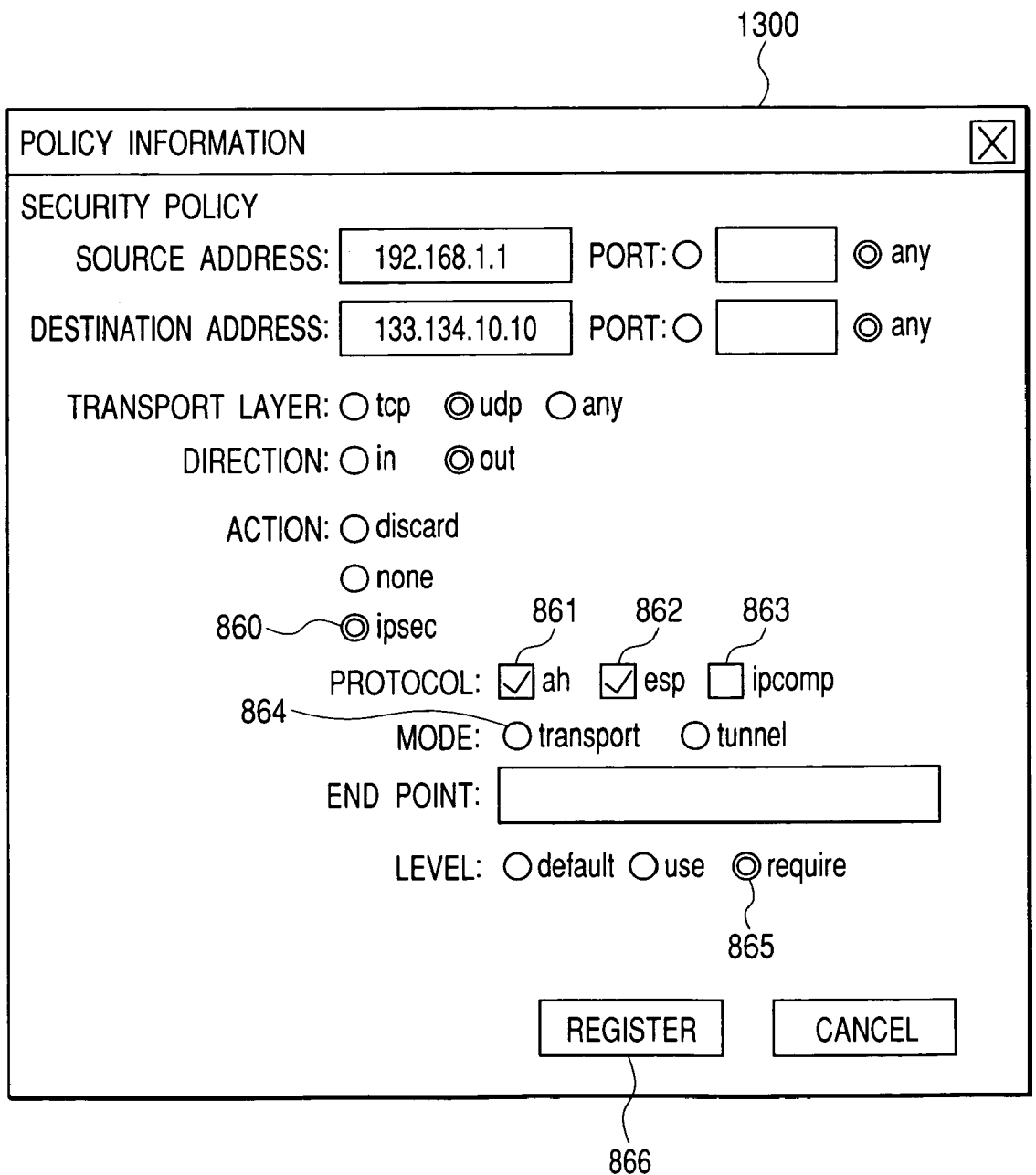
FIG. 13 is a view showing an example of a display screen after the security policy has been changed.

FIG. 13 shows an example of a display screen 1300 of the security policy changed in the step 608. From the drawing, it will be understood that, compared with the display screen prior to the change shown in FIG. 12, the user 9 has designated the security process "ipsec" (860) as an action, the authentication "ah" (861) and the encryption "esp" (862) as protocols, and the mandate "require" (865) as a security level. When the user 9 instructs the start of peer-to-peer communication with the peer's communication apparatus 11-2 (step 611) after the registration of the security policy, the communication apparatus 10 activates the peer-to-peer communication functional block 200 to start the peer-to-peer communication with the peer's communication apparatus 11-2 (step 612)

If the communication apparatus 10 changes the security level of the security policy received from the peer's communication apparatus and starts communication in accordance with the changed security policy as in the case of the second embodiment, a discrepancy occurs between the security policy (SP1) applied by the peer's communication apparatus 11-2 to a received packet and the security policy (SP2) applied by the communication apparatus 10 to a packet transmitted to the peer's communication apparatus 11-2 so that the security policy SP2 has a higher security level than the security policy SP1.

However, a packet transmitted on a security level higher than the security level specified by the security policy of the peer's communication apparatus 11-2 causes no problem, such as the refusal of the reception process, in the peer's communication apparatus 11-2. In this case, it is therefore unnecessary for the communication apparatus 10 to notify the peer's communication apparatus B11-2 of the changing of the security policy and to perform negotiation for the changing of the security policy.

Conversely, if the security level after the changing of the security policy becomes lower than the security level of the peer's communication apparatus 11-2 in the step 608 of FIG. 10, a packet transmitted from the communication apparatus 10 is subjected to a discarding process in accordance with the security policy of the peer's communication apparatus 11-2. Accordingly, it is necessary for the communication apparatus 10 to perform negotiation concerning the changing of the security policy with the peer's communication apparatus 11-2 prior to the transmission of the data packet.

Although the above embodiments have described examples in each of which the communication apparatus 10 acquires the security policy and the presence information from the peer's communication apparatus, judges the propriety of the security policy based on the presence information, and changes the security policy if necessary, if the communication apparatus 10 receives a request for the security policy and the presence information thereof from another communication apparatus, the communication apparatus 10 returns a response message including the security policy and presence information of the communication apparatus 10 to the requester, similarly to the peer's communication apparatus 11-1 and 11-2 in the embodiments. The response message is produced based on the presence information of the communication apparatus 10 read out by the peer-to-peer communication functional block 200 from the data base 400 via the presence information processing unit 401 and on the security policy of the communication apparatus 10 read out by the peer-to-peer communication functional block 200 from the data base 300 via the security policy processing unit 301. If the entry corresponding to the IP address of the requester has been registered in the data base 300, the security policy shown by the entry is adopted and, otherwise, the default security policy is adopted.

Although each of the embodiments has applied IPsec as the security communication protocol, it is also possible to apply another protocol for security communication by replacing the IPsec functional block 110. Although each of the embodiments has stored the security policy information and the presence information in the respective data bases 300 and 400, means for storing the information need not necessarily be a data base. For example, a table on a memory may also be used instead.

Although the user has judged the propriety of the security environment based on the location of the peer's communication apparatus shown by the presence information display screen and determined the security policy to be applied to the communication with the peer's communication apparatus, it is also possible to omit the display of the location of the peer's communication apparatus from the presence information display screen and allow the user to determine the network to which the peer's communication apparatus is connected from, e.g., the difference in address format between the source address and the destination address and estimate the communication security environment. Alternatively, it is also possible to allow the user under movement to input the current location from the peripheral device 20 such that a specific location name is outputted to the presence information display screen. The user may also judge the propriety of the security policy from extra factors not appearing on the presence information screen, such as the purpose of communication, the type of information to be transmitted, and the relationship between the user and the communication peer, in addition to the information on the location of the peer's communication apparatus.

As is obvious from the foregoing embodiments, the present invention enables peer-to-peer communication using a proper security policy in accordance with the communication security environment and the communication peer. By selecting a proper security policy in accordance with the communication security environment and circumventing peer-to-peer communication on an excessively high security level, according to the present invention, the CPU resources of a communication apparatus and the bandwidth of a communication network can be saved.

What is claimed is:

1. A peer-to-peer communication apparatus for performing one-to-one communication with another communication apparatus via an Internet Protocol (IP) network, comprising:
   first means for performing an encryption process and/or an authentication process with respect to a packet;
   second means for acquiring, from a peer's communication apparatus specified by a user of the peer-to-peer communication apparatus, presence information including information for judging a communication security environment of said peer's communication apparatus and security policy information including an encryption rule and an authentication rule, each to be applied to packets by said peer's communication apparatus; and
   third means for displaying said presence information and said security policy information such that said user judges propriety of the security policy information based on the presence information, and for allowing the user to partly change the security policy information,
   wherein said first means processes a packet to be transmitted to said peer's communication apparatus in accordance with a security policy approved by the user.

2. The peer-to-peer communication apparatus according to claim 1, further comprising:
   a memory for storing the security policy information acquired from said peer's communication apparatus or the security policy information partly changed by the user via said third means,
   wherein said first means processes the packet to be transmitted to the peer's communication apparatus in accordance with a security policy stored in the memory.

3. The peer-to-peer communication apparatus according to claim 1, further comprising:
   a first memory for storing default security policy information to be applied by the peer-to-peer communication apparatus to peer-to-peer communication with the peer's communication apparatus;
   a second memory for storing the presence information including the information for judging the communication security environment of the peer's communication apparatus; and
   fourth means for returning, in response to a request for the presence information and the security policy information from the peer's communication apparatus, a response message including the default security policy information read out from said first memory and the presence information read out from said second memory.

4. The peer-to-peer communication apparatus according to claim 3, further comprising:
   a presence information processing unit for partly changing, upon occurrence of a change in the communication environment resulting from movement of the peer's communication apparatus, said presence information stored in said second memory.

5. The peer-to-peer communication apparatus according to claim 1, wherein said first means processes a data packet to be transmitted and a packet received from the IP network in accordance with a security policy of IP security protocols defined by the Internet Engineering Task Force (IETF).

6. A method for peer-to-peer communication between a first communication apparatus and a second communication apparatus each connected to an Internet Protocol (IP) network, the method comprising the steps of:
   requesting, from the first communication apparatus to the second communication apparatus, presence information for judging a communication security environment of said second communication apparatus and security policy information including an encryption rule and an authentication rule to be applied to a packet by said second communication apparatus;
   transmitting, from the second communication apparatus to the first communication apparatus, the presence information and security policy information of the second communication apparatus;
   outputting to a display screen by the first communication apparatus, the presence information and security policy information received from said second communication apparatus, such that a user can judge propriety of the security policy information based on the presence information; and performing packet communication with the second communication apparatus by the first communication apparatus in accordance with the security policy approved by the user on said display screen.

7. The method for peer-to-peer communication according to claim 6, further comprising the step of:

allowing the user to partly correct the security policy information outputted to said display screen by the first communication apparatus, wherein the first communication apparatus performs the packet communication with the second communication apparatus in accordance with said corrected security policy.

* * * * *